July 4, 1961     X. L. BEAN     2,991,267
COATED SAND AND METHOD OF MAKING THE SAME
Filed April 10, 1957
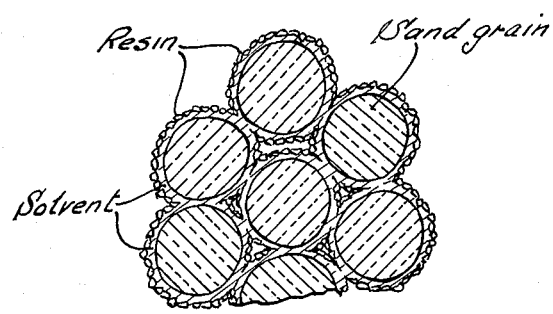
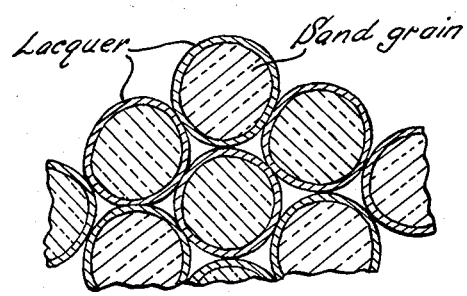
INVENTOR:
XARIFA L. BEAN
BY
ATTORNEYS.

United States Patent Office

2,991,267
Patented July 4, 1961

2,991,267
COATED SAND AND METHOD OF MAKING THE SAME
Xarifa L. Bean, Yellow Springs, Ohio, assignor to Morris Bean & Company, Yellow Springs, Ohio, a corporation of Ohio
Filed Apr. 10, 1957, Ser. No. 651,933
16 Claims. (Cl. 260—38)

This invention relates to a pourable, self-bonding, dry, granular material adapted for use in making bonded molds for metal casting and like porous articles, and to a method of making such material.

A prior copending application, Serial No. 199,006, filed December 4, 1950, now Patent No. 2,836,867, issued June 3, 1958, described methods and materials for precision casting, among them a resin-coated, dry, free-flowing sand, adapted to flow into all the fine detail of a pattern and, upon heating, to bond with contacting grains of the same material and to set to a strongly bonded, porous mass, particularly adapted for casting of metals such as iron. The present application is made in response to a requirement for division in said parent application and continues my claim to subject matter claimed therein and in part continues the disclosure of my said prior application.

It is an important object of my invention to reduce the cost of making molded articles and improve the perfection of reproduction; a more particular object is to increase the efficiency of foundry pattern equipment by reducing the time and the labor required for molding on patterns.

Another object of the invention is to provide a material capable of giving a high degree of accuracy in reproduction from a pattern or mold, and high strength and rigidity in the resulting article.

It is an object to provide a self-bonding material which when cured has high strength and rigidity and can retain its integrity until a molten material is cast against it, but the bond of which can be readily destroyed by continued exposure to heat such as that of molten cast metal.

It is also an object to provide accurate control of permeability and heat transfer in molded articles.

Another object of the invention is to provide an inexpensive and rapid method of making a self-bonding granular material.

In general, the invention aims to provide a material which by a simple process can be made into casting molds and other porous, rigid articles (the term "molds" is used herein to include cores and other molding parts) and particularly molds of highly refractory materials suitable for the production of castings in a wide variety of metals, and particularly precision castings of ferrous and other high-melting alloys.

Other objects, and the manner in which the objects are achieved, will appear from the following description and claims.

To this end, according to the invention, a refractory granular material, e.g., sand or the like, with or without classifying, e.g., by sifting, to suitable degree of fineness is treated to cover its grains with a material which is adapted by suitable treatment of the mass to develop a surface tackiness such that adjacent contacting grains become strongly bonded together to give a mass with strength, permeability and surface character largely determined by the presence of the binder, but which before said treatment is a non-adhesive coat which allows the grains to roll over one another.

In the use of the material of my invention, I have found three factors to be important in preparing an article, e.g., a casting mold, for greatest smoothness of surface and minuteness and accuracy of detail:

(1) Smallness of the particles on the surface to give the surface quality desired;

(2) Close packing of particles, but in the case of casting molds sufficient interstices should be left for escape of gases incidental to the casting.

(3) Bonding of each particle sufficiently to its neighbors so that it is not readily dislodged by treatment which the material is likely to encounter.

The extent to which conditions 2 and 3 are met determines the quality of result which can be obtained with particles which are small, but so that an article, e.g., a mold body, made out of these same particles, will have good permeability to gases. It is surprising the surface quality which can be obtained by perfect packing and bonding of that fraction of a washed, round grain sand; for example, such as an Ottawa sand, which will pass through a 100-mesh screen.

In the making of sand molds for casting metals, the "green bond" which ordinarily has to be relied upon in conventionally drawing a mold from the pattern is not sufficiently strong so that those grains which are packed into sharp corners or minute details can be removed with the mold; thus, even though major surfaces may be fairly smooth, the sharp corners and fine details will have lost their true sharpness and accuracy. In the process of the present invention, the bond which holds sand grains together is very strong, especially when it has been fully developed by a heating process.

According to the present invention, I coat the grains of sand (by which I mean granular refractory material, e.g., silica, alundum or zircon, etc.) with a resin coating enveloping the grains individually. This coat is solid and dry (i.e., non-sticky) at ordinary temperatures but is capable of becoming sticky and forming a strong bond at the points of contact between grains when heated to a temperature at which the resin is capable of being converted to an infusible bond, and is decomposable at a higher temperature below that at which the molten material is cast, whereby the bond is destroyed as the metal is solidified. Removal of the mold material from the casting is thus greatly facilitated.

In order to get perfect packing and perfect reproduction of detail, it is desirable that the coated sand be dry and round and smooth so that it will flow freely, like sand in an hourglass, and when vibrated will be made to occupy the minimum possible volume. In order to get perfect bonding, it is necessary that the bonding agent be present and effective (especially strong enough to resist damage in pattern removal, etc.) at the points of contact of the sand grains. By proper selection of sand, binder, and method of distribution of binder, it is possible with a single kind of sand to form an article such as a mold which will have surface smoothness, accuracy, permeability and refractoriness and thermal conductivity such that the castings obtained thereon have the desired character and properties as cast. For example, it has been possible and practical to make castings of gray iron for tire molds by this method which meet the exacting requirements of the rubber trade.

The best binders for the purposes herein described are of the class known as thermosetting resins which are adhesive to sand, especially phenol-aldehyde and melamine-aldehyde thermosetting bonding resins. A number of phenolic type resins have already come into use for bonding of sand in foundry molds and like articles; and these, in general, are satisfactory for the present invention. However, other strong settable binders, whether set by heat, by moisture or by catalysts, can be used in the invention.

The effectiveness of the binder in this invention is not only a matter of its adhesiveness and strength, but also of its distribution. It is so difficult to obtain, and particularly to maintain, satisfactory binder distribution for the exacting requirements of quality castings, that I have found it desirable to utilize according to this invention a separate step of binder distribution which makes possible (1) complete distribution and continuous coating of each grain of sand, and (2) a dry, free-flowing sand, easily distributed, and closely and uniformly packed over a pattern developing a strong bond at every point of contact of said grains with one another.

One very satisfactory method of distributing the binder is by means of a volatile solvent. Sand, binder and solvent are mixed together, and the mixing is continued until the sand is coated with a lacquer-like coating of resin and the coated sand is again dry and free flowing. A conventional sand muller works very well for the mixing operation.

Instead of dissolving the binder to a lacquer, it may be dispersed in a non-solvent e.g., as a slurry, which is mixed with the sand in like manner. Another method is to moisten the sand and then dust with the powdered binder, which adheres in a thin coat to the moisture film on each grain.

Good materials to use, for example, are phenol formaldehyde resins of grades generally available on the market for bonding foundry sand. Among these, may be mentioned the resins designated BR–15401, BR–18554 or BR–18478, all products of the Bakelite Division of Union Carbide & Carbon Corporation. These resins are as follows:

BR–15401 is a finely pulverized, heat-reactive one-step type phenol-formaldehyde resin prepared by condensation of phenol with more than a molar quantity of formaldehyde in the presence of an alkaline catalyst.

BR–18554 is a novolak or two-step type, acid-catalyzed condensation product of phenol and less than a molar quantity of formaldehyde reacted to a stage yielding a solid resin at room temperature, said resin being then finely pulverized and mixed with about 9 percent by weight of hexamethylenetetramine. The combination of resin and "hexa" results in a heat-reactive or thermosetting product.

BR–18478 is identical to BR–15401 but contains 3 percent by weight of magnesium silicate to prevent sintering of the pulverized resin during storage.

Good solvents for use in my invention, depending on the resin chosen, are acetone, methyl ethyl ketone, alcohol, etc. In general, from 1% to 4% by weight of binder is used, and from 1% to 4% of solvent.

One very satisfactory formula is 100 kg. of screened Ottawa sand, 2 kg. of phenolic binder resin of the grade designated BR–18478 and 3 liters of acetone. These ingredients are added, in the order named, into a conventional sand muller and mixed continuously until the sand grains are individually coated and the coating is dry and smooth, so that the product is a dry, free-flowing mass.

The sand thus coated will bond perfectly, even if heated in the presence of a large, wet, plaster pattern. It is important that the distribution of the resin in the mass is uniform and thorough. By contrast, resin which is merely distributed in finely divided form by conventional means (whether it is a powder or suspended in a slurry or as the commercial "liquid binder") is subject to migration, so that the binder may cause the molded mass to adhere in some parts to the pattern or other mold on which it is formed while having less than the desired amount of binder, and consequently less than the required strength or other property, in some part of the article from which the binder has migrated.

The proper distribution of binder is important also for securing the most effective use per unit cost of the binder.

The resulting coated sand can be used in this dry free-flowing form or can be mixed with a non-solvent liquid to a slurry, if desired. However used, the binder is in a film of predetermined thickness, and the flow, by rolling of the smooth grains over one another, is assured. In making a molded article—for example, a casting mold— it is possible to predetermine not only the surface characteristics of the article, but also characteristics of other parts, e.g., a finer sand used in the surface and coarser sand behind it, or finer sand in certain parts and coarser sand in others; likewise a thinner coating of resin can be used on the sand at the surface, so as to avoid the material strongly adhering to a mold or pattern, and a higher proportion of resin then used in the backup sand to give strength in the body and strongly hold the surface sand.

Although it is feasible to make a smooth, accurate article of a single kind of sand coated according to this invention, in the making of casting molds, for example, it is frequently desirable to use a finer sand for a facing layer and coarser sand for a back-up. This may be done by taking a fine fraction of the coated sand (that which passes a 140-mesh screen, or even a 200-mesh screen, for example) and pouring it over a damp plaster pattern, e.g., one of the type as set forth and claimed in my prior application. The fine particles stick as a very thin layer to the damp surface of the plaster pattern, and any non-adhering balance can be poured off. A similarly coated coarse sand, e.g., 50- or 70-mesh size, can then be poured in and the whole mass vibrated. The material is then heated, or otherwise treated, while thus on the molding surface, sufficiently to cause the surfaces of the bonding resin films to become tacky and adhere to one another. This is followed by a sufficient treatment to indurate the resin to a strong, hard bond, advantageously heating to convert the thermosetting resin to its infusible stage. A very satisfactory total result is obtained. This procedure gives a fine sand surface on the mold, and good reproduction of detail, and supports the surface by a more permeable backing.

Whatever pattern is chosen, its molding surface may be dampened or saturated (by dipping in a non-solvent liquid such as water, oil or kerosene), or it may otherwise be treated so that temporary adhesion is assured for every particle of fine sand which contacts it, thus assuring smoothness and accuracy of surface reproduction. No difficulty need be experienced in separating the finished, baked mold from the pattern, if the surface treatment as described above is one which affords no opportunity for the resin to penetrate the surface of the pattern.

In this way, as fine and as refractory a surfacing layer as desired can be made, and also by selection of grain size of the sand the mold body can be made as permeable as is necessary for the conditions of casting.

Other materials can be added to the sand mix, e.g., fillers such as wood flour, and other bodies can be incorporated in the mold or other article being made, e.g., steel reinforcings or metal chills, etc. or inserts which project from the mold to become imbedded in a casting when formed therein.

Instead of, or in admixture with, the phenolic resins above referred to, other thermosetting or hydrosetting resins and cements can be used, e.g., urea formaldehyde resin which first bonds the sand at lower temperature than the phenol formaldehyde binders, and therefore can be used as auxiliary binder to hold the mass before the phenolic binders become effective. Such auxiliary binders are not ordinarily necessary, and whether one is used or not will depend largely upon the special requirements of particular cases. Other thermosetting binders, and also low temperature setting binders, may be used in lieu of the phenol formaldehyde resin. My experience has shown, however, that advantage is gained by use of the phenolic type of resin specified above.

A wet slurry of sand with binder carried in the liquid phase can be used to form a facing layer, in conjunction with a coarser coated sand, according to my invention;

but special precautions should be taken to prevent the binder from adhering to the pattern or other forming mold.

It is an advantage of this invention, however, that a slurry can be made of granular refractory material having the binder in films on the surfaces of the grains, but not in the liquid phase. The film of binder may be thin enough so that, while it will adhere to the binder on adjacent particles after the liquid phase is removed, it will not be sufficient to cause serious adhesion to the pattern or forming mold surfaces. In any case, if any objectionable adhesion to the molding surface is experienced, a dusting of finely divided inert material on the molding surface before applying the dry coated sand is sufficient to prevent such adhesion, because the adhesiveness of the particles is merely a contact adhesiveness and the resin is not present in sufficient amount, or sufficient fluidity to flow beyond the dusting layer.

When the desired article has been built up in the manner above described, it is advantageously baked at a temperature and for a time sufficient to set the resin binder. When the thermosetting binders employed are the phenolic resins suggested above, the baking may be carried out satisfactorily at a temperature within the range of 400° F. to 475° F. the length of time required for complete setting of the resin varying somewhat with the size of the mold and running usually anywhere from 3 to 12 hours.

From the foregoing description of the invention, it will be seen that the use of coated sand and practice of the novel process of making it, when applied in manufacture of precision articles, result in the production of accurate, smooth surface which does not depend at all for its smoothness on a wash, dip or other after-treatment of the surface, but reproduces with high fidelity the surface of the original model. Moreover, such an article can be made with any desired permeability over 10 and in the case of casting molds advantageously from 50 to 200 as measured in the standard A.F.A. test piece in accordance with standards set up by the American Foundryman's Association. Although we find it highly advantageous to use plaster patterns, according to the invention set forth and claimed in my prior application, the present invention can be more broadly applied and various types of batterns and molds can be used as desired and with the ordinary skill of the user.

The above and the specific examples given below and shown in the accompanying drawings are not intended to be exhaustive or limiting of the invention in its broader aspects, but rather are illustrative for purposes of instructing others in the principles of the invention, and how to modify it so that all may be able to use it in a variety of embodiments, each as may be best suited to the conditions and requirements of its particular use.

In the drawings:

FIGURE 1 is a magnified sectional view of a mass of sand during mixing with a resin, showing the mixture after addition of the dry resin powder and solvent but before solution is complete;

FIGURE 2 is a similar fragmentary sectional view, also on an enlarged scale, of the mixture after solution is complete and the solvent has been evaporated.

In a specific example of the application of my invention in making a cast steel tread mold for rubber tires, a fine silica sand is selected and screened for size to give the desired surface moothness. The fraction which passes through a 100-mesh screen and is held on a 250-mesh screen (advantageously in the range 150–250 mesh) is then put in a sand muller, as above described, and mixed with 3% by weight of drypowdered, foundry bonding, phenolic resin, e.g., of the grade designated BR–18478.

When the powdered resin is well distributed through the sand, 3 liters of acetone per hundred kg. of sand are introduced, and mixing is continued until all of the acetone is evaporated. The powdered resin when first mixed with the sand, in part clings to the surfaces of the sand grains and in part is caught in the interstices between the points of contact of the grains. When the solvent is added, the surfaces of the sand grains are wet with a film of the solvent, which holds the resin particles, as shown in FIGURE 1. As the muller is operated, the wet grains are rubbed agsnst each other and against the particles of resin, thus quickly dissolving the resin in the solvent, enveloping each grain with the solution and eventually forming a dry, lacquer-like coating over each of the grains of sand.

During the mixing, the solvent is evaporated and, as it evaporates, the resin coating at first becomes more sticky; but, because of the constant tumbling and consequent crushing of any aggregates of sand grains, any excess of the binder which may tend to build up on some gains by tearing off some of the coat from the others is redistributed and rolled out into thin, substantially uniform, enveloping films. Eventually these films, as indicated in FIGURE 2 of the drawings, are dried to a hard, non-tacky condition.

If desired, the resin can be dissolved, e.g., in acetone, to form a liquid lacquer before mixing with the sand and dried in a single step, substantially as described above.

For fine casting work, such as tire molds and the like, I prefer to use for the fine surfaces a screened sand fraction in the range of 150 to 250 mesh.

A coarser sand is prepared for backing this fine surface sand, for example, an Ottawa bond sand, or an Ottawa banding sand, having a screen analysis as follows:

| | Percent |
|---|---|
| On 40-mesh screen | 1 |
| Through 40, retained on 50 | 29.5 |
| Through 50, retained on 80 | 55.5 |
| Through 80, retained on 100 | 8.4 |
| Through 100, retained on 200 | 5.3 |
| Through 200 | .3 |

This sand is put in the muller and coated in the same manner as with the finer sand.

In use, a very thin layer of fines is formed on the pattern, e.g., in the manner set forth in my said prior application, by moistening the surface of a plaster pattern, pouring the fine sand over it, pouring off the excess so that only that which is held by the wet surface of the plaster remains (e.g. a layer ⅛ inch or less) and then pouring in the coarser, resin-coated sand and the whole vibrated to assure packing. The mold is then put into an oven and baked in an atmosphere held at 425° F. for 3 to 12 hours, after which the pattern is removed.

As will be noted here, instead of treating sands which have previously been classified in uniform particle size, a sand having a wide range of particle sizes is coated with the bonding resin leaving the individual particles smooth and free to flow over one another. Thereafter, the coated sand can be screened or classified by other methods or may be used without classification for the forming of an article.

A single, carefully selected fine or medium fine sand may be used for the whole mold, instead of a surfacing layer and a back-up layer.

Although I have referred specifically to silica sand, it will be evident to those skilled in the art that other types of refractory granules can be used; and these I refer to generally in this specification as "sand." Other and more expensive materials may be desirable, especially for the surfacing layer.

Moreover, less binder than the 3% specified above may be used, depending upon the conditions and the part being made. In general, the binder percentage will range between ½% and 5%. The resin coating on the individual grains of sand should be of the order of .0001 inch and advantageously from .00004 to .0001 inch.

Other binders may be substituted for the particular resins mentioned in these examples; other synthetic settable binders may be used instead of the phenolic resins, and even natural resins, such as natural wood resins, can be used to form a dry coating on each sand grain and substantially bond such grains in the sand after it has been flowed into place.

Auxiliary binders, selected for their ability to maintain a constant volume in the sand mass during curing, may be introduced, e.g., urea formaldehyde binders. These should be such fine powder, or in such thin suspension or solution, that they bond in the crevices between adjacent particles without holding the particles apart. Setting will be by exposure to water, heating, or other methods, depending on the binder selected.

Other methods of activating the bonding resin and of curing or setting it may also be used; for example, dielectric baking which has been found by the foundry industry to be a very successful method of curing resins of the type we prefer to use, in a matter of a few minutes. This method has the advantage of very quick and uniform cure, and very close process control. Also, one may use a water-setting resin such as urea formaldehyde or the so-called synthetic resin "powdered glues," preferably dissolving such resins in an organic solvent and lacquering the sand grains therewith as above described, applying the dried grains to the pattern as before and then exposing the lacquered sand mass to water, e.g., by diffusion from the wet pattern, or by treatment with saturated steam.

Where the surface of the pattern is one which will not adhere to the binder, or it is permissible to treat the surface with an effective parting agent, a slurry coat may be used instead of the fine, dry coated sand but with sacrifice of some of the advantages of the above example. For example, the surface of a wastable pattern can be treated with a thin acetone solution of flexible collodion, or the like, and dusted with aluminum powder, red iron oxide, graphite or other suitable pigment, as set forth in said prior application. The treated surface is then sprayed immediately with a slurry consisting of 100 parts of Albany bank sand, that fraction which would pass through a 50-mesh screen (it is also treated to screen out any miscellaneous coarse particles); 2 parts of a powdered phenolic resin, e.g., of the same grade as used in the previous example, and 1.8 parts of a liquid phenolic bonding resin, e.g., the grade designated by Union Carbide and Carbon Corporation as BR–18261, all mixed with water to a proper consistency for spraying. The clay which is contained in the Albany bank sand lends plasticity to the slurry and facilitates the use of the dry and liquid resins in combination, even though combination of these two resins heretofore had proved unsatisfactory because of their tendency to combine into small taffy-like lumps which are not easily re-distributed.

This slurry coat is sprayed onto the surface of the disposable pattern to a desired thickness (advantageously .005 inch to .020 inch; in any case, less than about 0.1 inch), as uniformly as possible. Before the slurry has a chance to dry, it is backed up by pouring over it the desired depth or thickness of coated sand, such as described in the previous example, and the whole assembly is vibrated to effect packing of the coated sand, after which the article thus formed may be dried and baked so as to effect fusion and indurating of the bond at points where the granules contact one another.

Other parting coatings may be used, including as well as other fine refractory powders, other liquids, e.g., a water solution of green soap when sprayed on a plaster pattern.

Other finely divided refractories may be used in the slurry coat, e.g., a good slurry can be made with 10 parts pigment of red iron oxide, 90 parts silica flour, 4 parts phenolic resin powder of the grade used in the previous example, 3.6 parts of the liquid phenolic resin of the grade used in the previous example, and water to give the desired slurry consistency.

Other liquid vehicles than water may be used in the slurry coat, if compatible with the resins used.

Where the powdered resin is used without the liquid resin to form the fine surfacing layer, it is advantageous to use a vaporizable liquid material such as kerosene or No. 2 diesel oil.

According to the manufacturer's description: BR–18261 is a heat-reactive, low-viscosity liquid alkaline catalyzed condensation product of phenol and more than an equimolar amount of formalin, reacted only to a stage where the product is miscible with more than an equal amount of water. Its viscosity is ordinarily between 80 and 120 cps. at 25° C., specific gravity between 1.195 and 1.205, and non-volatile matter is about 64 percent.

From the foregoing, it may be seen that the invention makes possible the formation of articles of accurate form and desired surface and with perfectly controlled interior structure, texture, strength and other properties. By virtue of the very thin film coating of the individual granules, they are strongly bonded without filling the interstices and the particles are in substantial contact, so as to give relatively high, thermal conductivity, important in a casting mold and for other articles, as well as high compressive strength.

I claim:

1. A dry, free-flowing, self-bonding, granular composition for forming into foundry casting molds and the like while in said dry and free-flowing state and consisting of individually coated sand granules, the coatings thereon being dry and non-adhesive films of thermosetting resin binder for adhering said individual granules together upon activation and setting of said binder at the points of contact among said granules into a rigid foundry mold but being dry and non-tacky prior to said activation and setting for maintaining said free-flowing condition of said composition.

2. A dry, free-flowing, self-bonding, granular composition for forming into foundry casting molds and the like while in said dry and free-flowing state and comprising essentially sand granules having thereon a dry and non-tacky coating of resin binder material including a thermosetting resin, said coating forming substantially continuous and separate non-tacky enveloping films on individual sand granules for maintaining said free-flowing characteristic of said composition and for bonding said individual granules at points of contact thereamong upon activation and setting of said binder to form a rigid mold.

3. A composition as defined in claim 2 in which the sand consists of washed, substantially round grains finer than 50 mesh.

4. A composition as defined in claim 2 in which the sand consists of washed, substantially round grains finer than 150 mesh.

5. A composition as defined in claim 2 in which the amount of binder is substantially ½% to 5% by weight on the sand.

6. A composition as defined in claim 2 in which the amount of binder is substantially 1% to 4% by weight on the sand.

7. A composition as defined in claim 2 in which the sand granules are of a size between 150 mesh and 250 mesh and the resin binder is a thermosetting phenol-formaldehyde resin polymerized to a stage where it becomes adhesive upon heating before being converted or set by heat to an infusible state.

8. A composition as defined in claim 2 in which the thickness of the binding material coating is approximately 0.0001 inch, whereby adjacent granules of coated sand substantially touch one another while open interstices remain therebetween.

9. A dry, free-flowing, self-bonding, granular composition for forming into foundry casting molds and the like in said dry and free-flowing state and comprising essentially sand granules having thereon a dry and non-tacky coating of resin binder material including a thermosetting resin in a thermoplastic plastic stage, said coating forming substantially continuous and separate non-tacky enveloping films on individual sand granules for maintaining said free-flowing characteristic of said composition and for bonding said individual granules at points of contact thereamong upon activation and setting of said binder to form a rigid mold.

10. A dry, free-flowing, self-bonding, granular composition for forming into foundry casting molds and the like while in said dry and free-flowing state and comprising essentially sand granules having thereon a dry and non-tacky coating of resin binder material including a thermosetting phenolic resin, said coating forming substantially continuous and separate non-tacky enveloping films on individual sand granules for maintaining said free-flowing characteristic of said composition and for bonding said individual granules at points of contact thereamong upon activation and setting of said binder to form a rigid mold.

11. A dry, free-flowing, self-bonding, granular composition for forming into foundry casting molds and the like in said dry and free-flowing state and comprising essentially sand granules having thereon a dry and non-tacky coating of resin binder material including a thermosetting phenolic resin in a thermoplastic plastic stage, said coating forming substantially continuous and separate non-tacky enveloping films on individual sand granules for maintaining said free-flowing characteristic of said composition and for bonding said individual granules at points of contact thereamong upon activation and setting of said binder to form a rigid mold.

12. As a dry, free-flowing, self-bonding granular composition for forming into foundry casting molds and the like while in said dry and free-flowing state, discrete and free-flowing particles of sand individually coated with a solid and non-tacky layer of a thermosetting resin material composed of acid-catalyzed phenol-formaldehyde resin including and partially reacted with hexamethylene tetramine.

13. As a dry, free-flowing, granular composition of matter, a mass of discrete and free-flowing particles of sand individually coated with a solid and non-tacky layer of a thermosetting resin composed of alkaline-catalyzed phenol-formaldehyde resin.

14. As a dry, free-flowing, self-bonding granular composition for forming into foundry casting molds and the like while in said dry and free-flowing state, discrete and free-flowing particles of sand individually coated with a solid and non-tacky layer of a thermosetting resin material composed of acid-catalyzed 2-step phenol-formaldehyde resin including and partially reacted with hexamethylene tetramine.

15. As a dry, free-flowing, granular composition of matter, a mass of discrete and free-flowing particles of sand individually coated with a solid and non-tacky layer of a thermosetting resin composed of alkaline-catalyzed 1-step phenol-formaldehyde resin.

16. As a dry and free-flowing granular composition for forming rigid foundry casting molds and the like, a free-flowing mass of non-tacky sand granules wherein each granule of sand is separate from adjacent granules and wherein said sand granules are individually coated with a thermosetting resin binding material non-tacky at room temperatures but becoming tacky at elevated temperatures before setting, said binding material being in films completely enveloping individual said sand granules, and said coated sand being convertible without application of external pressure into a strong rigid mass by application of heat sufficient to set said binding material coatings and to coalesce said coatings at points of contact among said granules for binding said granules together into a rigid mold structure.

References Cited in the file of this patent

UNITED STATES PATENTS

| | | |
|---|---|---|
| 1,090,439 | Aylsworth | Mar. 17, 1914 |
| 2,517,815 | Weston | Aug. 8, 1950 |
| 2,521,614 | Valyi | Sept. 5, 1950 |
| 2,706,188 | Fitko et al. | Apr. 12, 1955 |
| 2,830,342 | Myers et al. | Apr. 15, 1958 |